United States Patent
Yazaki et al.

(10) Patent No.: US 7,012,890 B2
(45) Date of Patent: Mar. 14, 2006

(54) PACKET FORWARDING APPARATUS WITH PACKET CONTROLLING FUNCTIONS

(75) Inventors: Takeki Yazaki, Hachioji (JP); Yuichi Ishikawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 965 days.

(21) Appl. No.: 10/014,413

(22) Filed: Dec. 14, 2001

(65) Prior Publication Data

US 2003/0002438 A1  Jan. 2, 2003

(30) Foreign Application Priority Data

Jul. 2, 2001  (JP)  ............................ 2001-200437

(51) Int. Cl.
*G01R 31/08* (2006.01)

(52) U.S. Cl. .................................... 370/229; 370/389

(58) Field of Classification Search ................ 370/229, 370/389, 395, 401, 230, 445, 408

See application file for complete search history.

(56) References Cited

U.S. PATENT DOCUMENTS

| | | | | |
|---|---|---|---|---|
| 5,809,012 | A * | 9/1998 | Takase et al. | 370/229 |
| 6,788,683 | B1 * | 9/2004 | Ikeda et al. | 370/389 |
| 2003/0002438 | A1 * | 1/2003 | Yazaki et al. | 370/229 |
| 2003/0043802 | A1 * | 3/2003 | Yazaki et al. | 370/389 |

FOREIGN PATENT DOCUMENTS

| | | |
|---|---|---|
| JP | 08-288950 | 4/1995 |
| JP | 11-102589 | 9/1997 |

OTHER PUBLICATIONS

Masanori Uga and Kohei Shiomoto, "A Flow Identification Method Using Content Addressable Memory", Proceedings of the 2000 IEICE General Conference, SB 4-2, p. 654.

* cited by examiner

*Primary Examiner*—Chi Pham
*Assistant Examiner*—Prenell Jones
(74) *Attorney, Agent, or Firm*—Reed Smith LLP; Stanley P. Fisher, Esq.; Juan Carlos A. Marquez, Esq.

(57) ABSTRACT

A packet forwarding apparatus which quickly selects a plurality of control information entries to be applied according to header information of an input packet and concurrently performs various the header processing functions. The packet forwarding apparatus comprises a flow retrieval unit which compares header information of the input packet with plural sets of flow identification conditions and concurrently outputs various flow identifiers appropriate to the input packet, various header processing units corresponding to the flow identifiers, and a packet forwarding control unit for controlling forwarding of input packets according to control information outputted from at least one of the header processing units. While each of the header processing units has an information table containing plural information entries, reads a single information entry from the information table according to the flow identifier outputted from the flow retrieval unit, and executes a prescribed arithmetic operation.

18 Claims, 16 Drawing Sheets

FIG. 11

BANDWIDTH CHECK TABLE 73

| TABLE ADDRESS | THR (731) | POLR (732) | TS (733) | CNT (734) | CTOS (735) | NTOS (736) | |
|---|---|---|---|---|---|---|---|
| 1 | THR | POLR | TS | CNT | CTOS | NTOS | BE-1 |
| 2 | THR | POLR | TS | CNT | CTOS | NTOS | BE-2 |
| ⋮ | | | | | | | |
| m | THR | POLR | TS | CNT | CTOS | NTOS | BE-m |

PACKET FORWARDING APPARATUS WITH PACKET CONTROLLING FUNCTIONS

BACKGROUND OF THE INVENTION

1. Field of the Invention

The present invention relates to a packet forwarding apparatus which interconnects a plurality of networks, and particularly relates to a packet forwarding apparatus which provides various packet controlling functions including filtering and service quality control.

2. Description of Related Art

A router as a portion of an IP (Internet Protocol) network requires a flow retrieval function which detects, from header information for an input packet, the flow to which the packet belongs. In this specification, we call a series of packets which are identified by a combination of header information included in the packet header as a "flow." The router performs packet controlling functions for each flow such as service quality control, statistic information control, filtering, and policy routing.

Recently, in order to cope with rapidly increasing IP traffic, a method for quicker flow retrieval has been explored. One example is the flow identification method proposed in Proceeding SB-4-2, M. Uga et al. tilted as, "A flow identification method using content addressable memory", Proceedings of the 2000 IEICE General Meeting. The method is based on a CAM (Content addressable Memory) storing plural flow entries which describe flow identification conditions, and a retrieval result holding table storing plural table entries describing processing operations to be performed on an input packet according to each flow entry.

In the above-mentioned prior art, all necessary header fields for flow identification are extracted from header information of an input packet as retrieval key information and the CAM is searched to retrieve flow entries which match with the above-mentioned retrieval key information. The CAM quickly retrieves flow entries whose flow identification conditions match with the retrieval key information, regardless of the number of flow entries registered, and outputs, as a retrieval result, the address of the flow entry whose CAM address is the smallest among the retrieved flow entries.

The input packet is processed according to the description in the table entry read from the retrieval result holding table, based on the above-mentioned flow entry address. Therefore, if a table entry as an instruction for filtering of packets is registered at a specific address in the retrieval result holding table, it is possible to perform filtering of a group of packets which satisfy the flow identification condition as indicated by a specific flow entry with the CAM address corresponding to that table entry.

If a table entry which specifies, for example, the type of service (TOS) is registered at another address in the retrieval result holding table, service quality can be controlled for packets which belong to a specific flow corresponding to the table entry, which matches the above TOS information. Also, if a table entry which specifies, for example, a next hop address is registered in the retrieval result holding table, policy routing can be done on packets which belong to a specific flow corresponding to that table entry, where policy routing is performed by applying the next hop address specified by the above table entry instead of the next hop address decided automatically by the routing protocol.

In the above-mentioned prior art, a flow entry address is outputted from the CAM according to input packet header information. Then a table entry is read out from the retrieval result holding table according to that front entry address. The input packet is then processed according to the description in the table entry. This means that according to the above-mentioned prior art, only a specific type of packet processing as specified by the table entry can be performed on an input packet whose flow is identified but not on two or more types of packet processing such as service quality control and policy routing, at a time.

BRIEF SUMMARY OF THE INVENTION

One object of the present invention is to provide a packet forwarding apparatus which can perform concurrently various packet control functions, such as service quality control, statistic information control, policy routing, and filtering, on each packet whose flow is identified.

Another object of the present invention is to provide a packet forwarding apparatus which quickly selects plural control information entries to be applied according to input packet header information, and concurrently performs various types of header information processing.

In order to achieve the above-mentioned objects, according to one aspect of the present invention, the packet forwarding apparatus comprises a flow retrieval unit which compares header information of an input packet with plural sets of flow identification conditions then outputs various flow identifiers corresponding to the above-mentioned input packet concurrently, a plurality of header processing units for matching the flow identifiers, and a means for controlling forwarding of input packets according to the control information outputted from at least one of the header processing units. While each of the header processing units has an information table containing plural information entries, it reads a single information entry from the information table in accordance with the flow identifier outputted from the flow retrieval unit, and it uses that information entry to perform a given arithmetic operation.

More specifically, according to another aspect of the present invention, the packet forwarding apparatus has plural input line interfaces connected with the respective input lines, and each of the input line interfaces comprises a means for providing the flow retrieval unit with the header information extracted from an input packet; and a packet, forwarding control means for rewriting a portion of the header information of the input packet according to control information outputted from at least one of the header processing units.

According to another aspect of the present invention, the flow retrieval unit in the packet forwarding apparatus comprises: plural content addressable memories ("CAM") consisting of a plurality of flow entries indicating flow identification conditions respectively, and a memory access control unit for generating a flow retrieval key based upon the header information received from an input line interface and concurrently accesses the content addressable memories. While each of the header processing units reads an information entry from the information table in accordance with one of the flow identifiers outputted concurrently from the content addressable memories.

According to another aspect of the present invention, the content addressable memories are concurrently accessed by the same flow retrieval key outputted form the memory access control unit. If at least one of the content addressable memories has a flow entry to be accessed by a flow retrieval key other than the one for the other CAMs, the memory access control unit outputs the above flow retrieval keys in two groups: one group with common key fields for all the CAMs and the other group specific key fields for a specific CAM, and selectively inputs the above-mentioned common key fields and specific ones to each CAM.

According to another aspect of the present invention, the flow retrieval unit combined with the header processing units concurrently carries out various header processing operations, such as statistic information control for each flow, service quality control, packet policy routing, and packet filtering. The flow identification conditions for the flow retrieval unit are defined by at least one of a source address and a destination address both of which are included in the packet header, a source application identifier, a destination application identifier, and priority information, such as TOS in packet forwarding.

According to another aspect of the present invention, a packet forwarding method for performing at least two packet controlling function concurrently, comprising: defining a plurality sets of flow identification conditions to classify input packages into one flow with one set of the plurality sets of flow identification conditions; storing the flow identification conditions in at least two content addressable memories (CAMs); comparing and matching header information of each input packet with a plurality sets of flow identification conditions to identify at least two flows; designating one flow identifier associated with the input packet for each of the identified flows; outputting the flow identifiers concurrently and respectively to at least two header processing units; in each of the header processing units, incorporating an information table including a plurality of information entries, reading a single information entry from the information table according to the respective flow identifier, executing a given arithmetic operation with the single information entry; and forwarding the input packet according to control information which includes the executed result from at least one of the header processing units.

Other objects of the present invention, its features and functions will be clarified in preferred embodiments which will be later described referring to the attached drawings.

BRIEF DESCRIPTION OF THE DRAWINGS

FIG. 11 shows the structure of a bandwidth check table 73;

DETAILED DESCRIPTION OF THE PREFERRED EMBODIMENTS

A packet forwarding apparatus according to one preferred embodiment of the present invention has a router which concurrently performs the following four types of packet processings depending on the result of an input packet flow retrieval: service quality control, statistic information control, policy routing and filtering.

Figure 1:
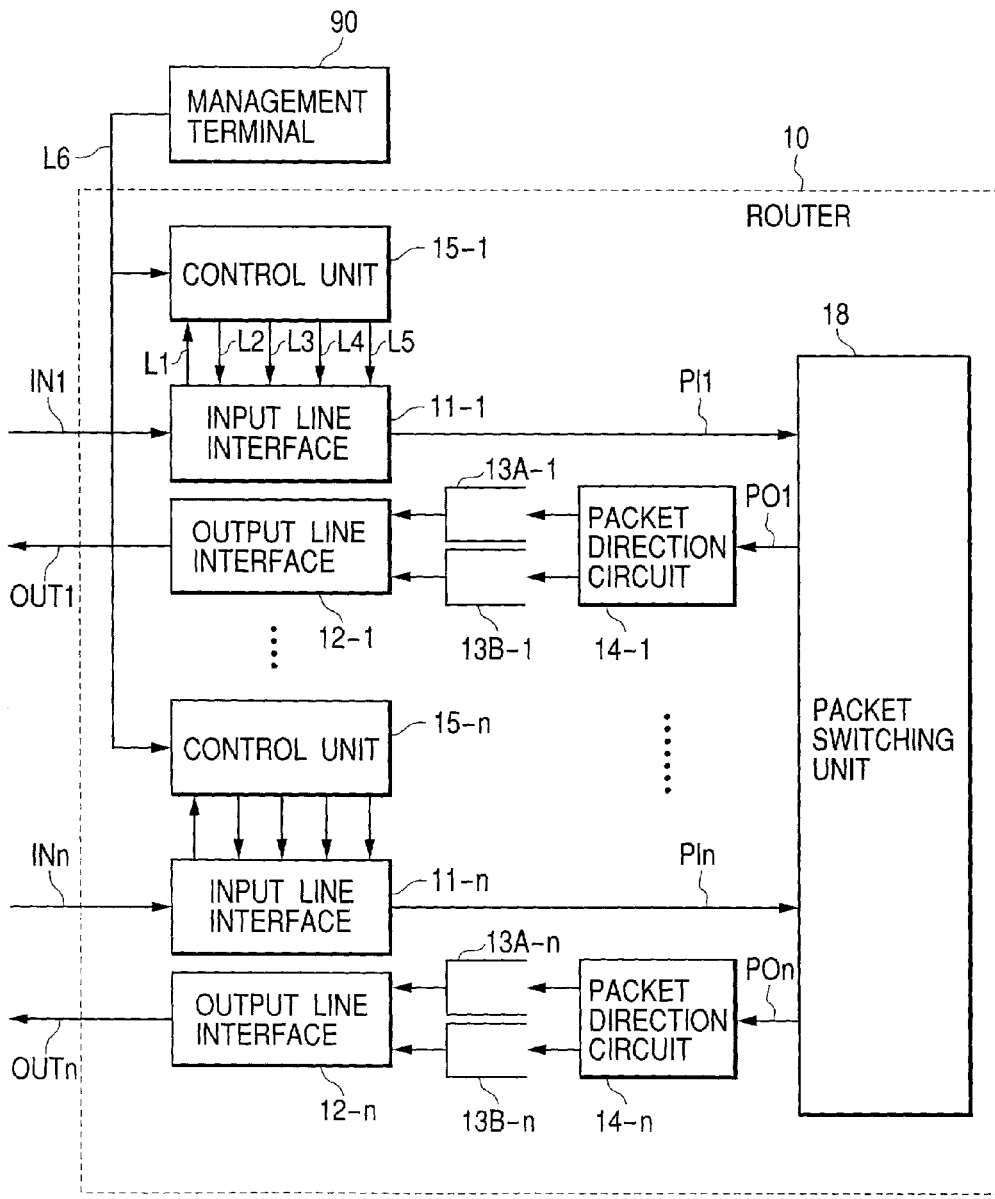
FIG. 1 is a block diagram illustrating a router 10 according to one embodiment of the present invention.

FIG. 1 shows the structure of a router 10 according to the preferred embodiment of the present invention.

The router 10 includes a plurality of input line interfaces 11$i$ (i=1 to n) connected with respective input lines INi (i=1 to n), a plurality of output line interfaces 12$i$ (i=1 to n) connected with respective output lines OUTi (i=1 to n), an output buffer for high priority 13A-i (i=1 to n), another output buffer for low priority 13B-i (i=1 to n) provided for each of the output line interfaces 12i, packet direction circuits 14-i (i=1 to n) for outputting packets into either of the above two buffers depending on their priority, a packet switching unit 18 connected with the input line interfaces 11-i and the packet direction circuits 14-i, a control unit 15 for assigning one output line as the destination for the variable-length packet received by each input line interface 11i, a routing function, or a function for service quality control (ex. bandwidth check), and control units 15-i (i=1 to n) connected with the respective input line interfaces 11-i.

The control unit 15 provides a routing function according to the header information of an input packet, and a flow retrieval function, and various packet processing functions. Also, the control unit 15 has CAMs prepared for various types of packet processings and various control information tables to be accessed according to entry addresses outputted from these CAMs as flow identifiers. Data is set on these CAMs and control information tables through signal line L6 from a management terminal 90.

Figure 2:
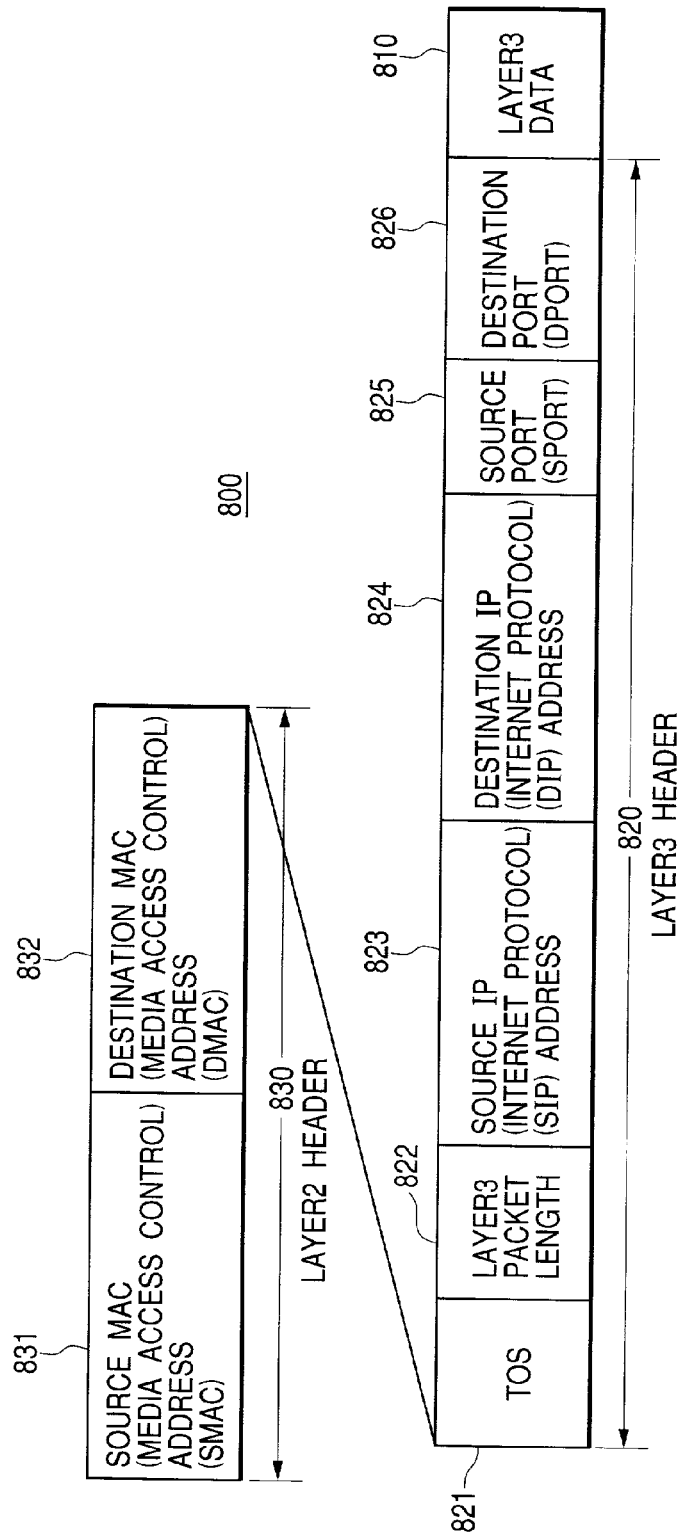
FIG. 2 shows an input packet format for the router 10 in FIG. 1.

FIG. 2 shows one example of a format of a variable-length packet each input line IN-i receives.

A variable-length input packet 800 received by each input line IN-I consists of L2 header 830 including header information in the second layer (data link layer) in the open system interconnection ("OSI") reference model, L3 header 820 including header information in the third layer (network layer), and L3 data 810.

The format of L2 header 830 varies depending on the type of input lines. If the input lines IN-i support Ethernet, L2 header 830 includes packet (data) length and other information as well as Source MAC (Media Access Control) address (SMAC) 831, and Destination MAC (Media Access Control) address (DMAC) 832.

If the protocol for the network layer supports IP (Internet Protocol), L3 header 820 includes the information of Type of Service (TOS) 821 which indicates the priority in packet forwarding within the network, L3 packet length 822, Source IP address (SIP) 823 which indicates the packet is sent from which terminal (the source), Destination IP address (DIP) 824 which indicates the terminal to which the packet is sent, etc. To simplify the explanation of the flow identification process, the following information are also treated as a portion of L3 header 820: the header information as used when the protocol for the fourth layer (transport layer) in the OSI reference model is TCP (Transmission Control Protocol) or UDP (User Datagram Protocol), such as Source Port (SPORT) 825 indicating the source protocol (upper application) and Destination Port (DPORT) 826 indicating the destination protocol.

Although the explanation given here assumes that the protocol for the network layer is IP, the router 10 according to the present invention may use a protocol other than IP, for example, IPX. L3 data 810 includes header information and user information in a layer above the layer of L3 header.

Figure 3:
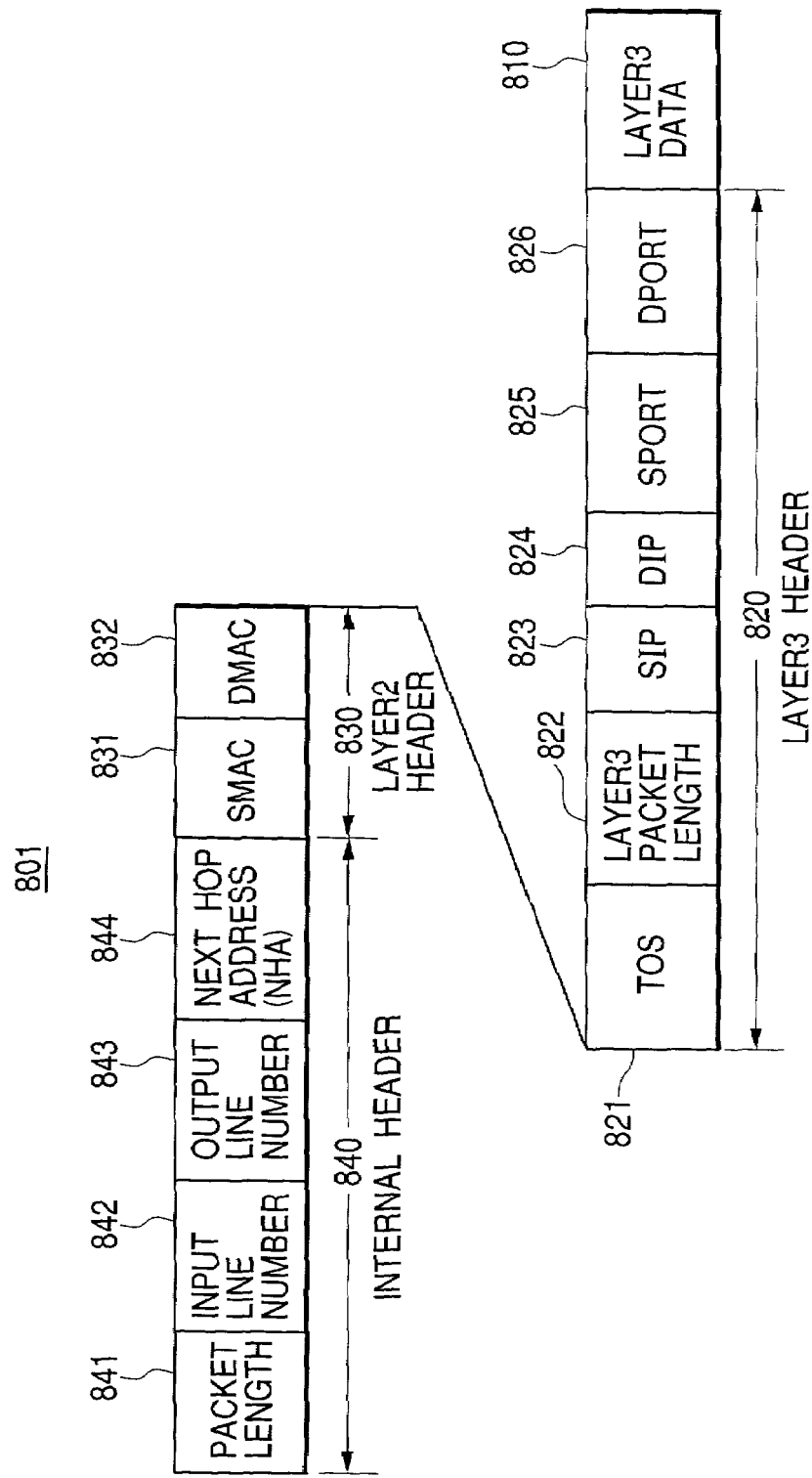
FIG. 3 shows another internal packet format for the router 10 in FIG. 1.

FIG. 3 shows the format of a packet inside the router 10.

The packet (internal packet) 801 to be forwarded inside the router 10 has a format in which internal header 840 is added to the input packet 800. The internal header 840 includes packet length 841 indicating the overall length of the packet excluding the internal header 840, an input line number 842 as a packet input line identifier, an output line number 843 as a packet output line identifier, and a next hop address (NHA) 844 indicating the network layer address of the next node in the network over which this packet is forwarded.

However, the internal packet 801 may take another form. L2 header 830 can be excluded from the input packet 800, and then internal header 840 is added. In the embodiment described below, the value of packet length 841 is treated as the packet length for each input packet for checking the bandwidth of each flow.

Figure 4:
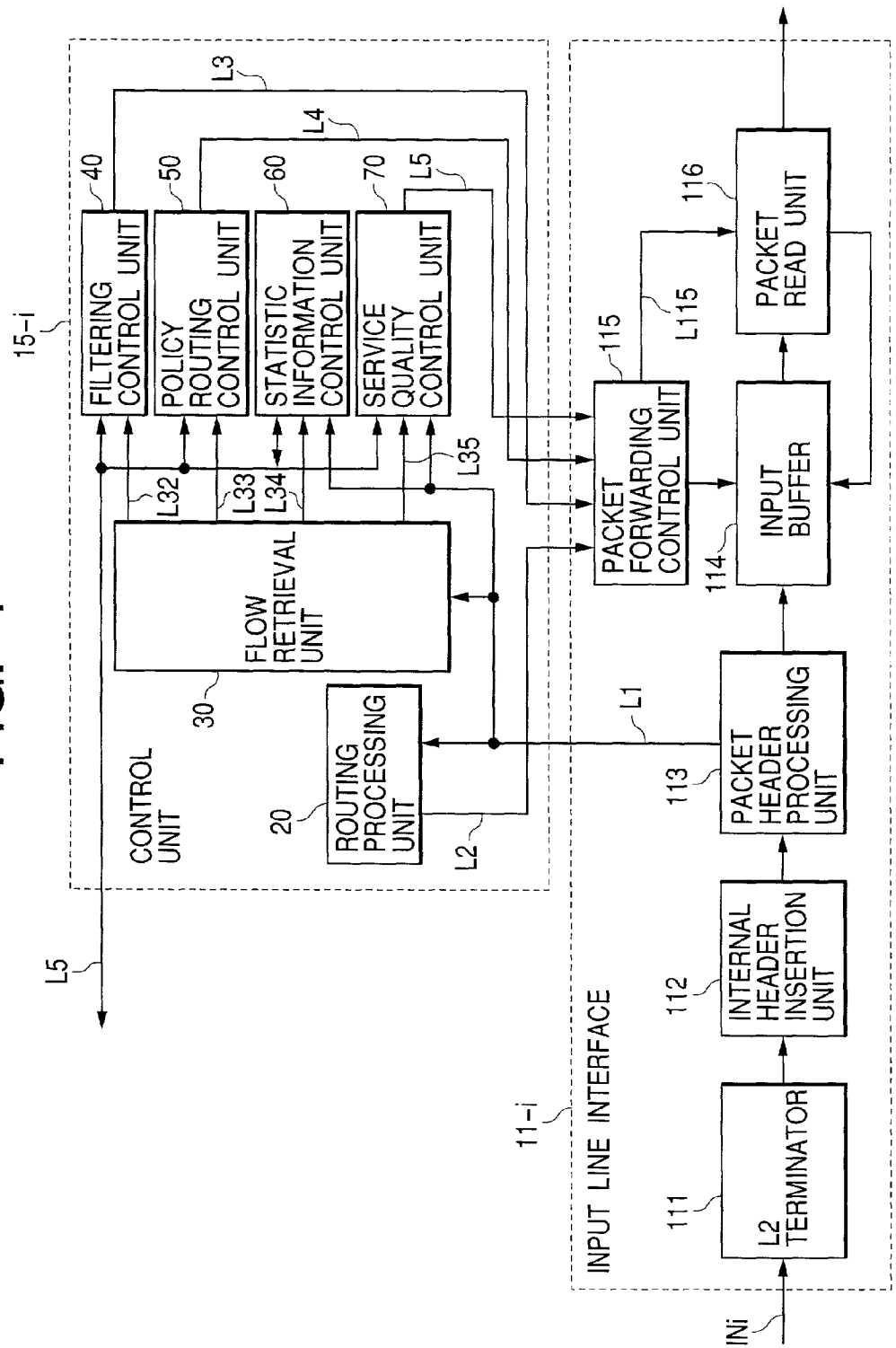
FIG. 4 is a block diagram illustrating the structure of an input line interface 11-i and a control unit 15-i in the router 10 in FIG. 1.

FIG. 4 shows the structure of an input line interface 11-i and a control unit 15-i.

The input line interface 11-i consists of an L2 terminator 111, an internal header insertion unit 112, a packet header processing unit 113, an input buffer 114, a packet forwarding control unit 115, and a packet read unit 116. The L2 terminator 111 reproduces an input packet 500 from a signal received from the input line INi. The internal header insertion unit 112 adds the internal header 840 to the input packet received from the L2 terminator 111 and outputs it as the internal packet 801 as shown in FIG. 3. The packet header processing unit 113 outputs the internal packet 801 to the input buffer 114 and outputs the packet header (including internal header 840, L2 header 830, and L3 header 820) extracted from the internal packet 801 to the signal line L1-i. The packet forwarding control unit 115 controls rewriting of the header information of the packet stored in the input buffer 114 and its forwarding to the packet switching unit 18. The packet read unit 116 reads the packet whose header has been changed, from the input buffer 114.

The internal header insertion unit 112 counts the byte length of the input packet it has received from the L2 terminator 111, and sets the count value as the packet length 841 in the internal header. It also writes the predetermined identifier (number) of the input line INi as the input line number 842, and sets meaningless values as the output line number 843 and next hop address 844.

The control unit 15-i consists of a routing processing unit 20, a flow retrieval unit 30, a filtering control unit 40, a policy routing control unit 50, a statistic information control unit 60, and a service quality control unit 70.

The routing processing unit 20 has a routing table. It extracts the destination IP address 823 from the packet header information outputted from the packet header processing unit 113 through the signal line L1, and reads from the routing table the next hop address previously registered to match the above-mentioned destination IP address and the relevant output line identifier (output line number), and outputs them as routing information through the signal line L2.

In this example, the routing processing unit 20 is a portion of the control unit 15-i. However, it may be a portion of the input line interface 11-i instead.

As described later in FIG. 5, the flow retrieval unit 30 incorporates CAMs 32 to 35 which correspond to the filtering control unit 40, the policy routing control unit 50, the statistic information control unit 60, and the service quality control unit 70, respectively. Using the header information in a specific field of the packet header received through the signal line (data bus) L1 as a retrieval key, these CAMs are accessed and the flow identifiers (flow entry addresses) from the CAMs 32 to 35 are given to the filtering control unit 40, the policy routing control unit 50, the statistic information control unit 60, and the service quality control unit 70 through signal lines L32, L33, L34 and L35, respectively.

As shown later in FIG. 13, the filtering control unit 40 references a filtering table 41 in accordance with the flow identifier for filtering what it has received through the signal line L32, and issues to the signal line L3 the filtering control information to indicate whether to reject (discard) or accept (pass) the input packet according to the definition of a control information entry in the filtering table 41.

As shown later in FIG. 15, the policy routing control unit 50 references a policy routing table 51 in accordance with the flow identifier for policy routing it has received through the signal line L33, and decides whether policy routing is required or not according to the definition of an control information entry in the policy routing table 51. In executing of the policy routing, the policy routing control unit 50 issues the following information to the signal line L4: the flag information to indicate the execution of policy routing, the policy routing information including the next hop address to be preferentially applied, compared with the next hop address generated in the routing processing unit 20, and the relevant output line number.

As shown later in FIG. 17, the statistic information control unit 60 reads an entry for the counter from a statistic table 61 in accordance with the flow identifier for statistic information it has received through the signal line L34, and updates the counter reading according to the packet length 841 in the packet header information received from the signal line L1.

As shown later in FIG. 10, the service quality control unit 70 reads bandwidth check control parameters from a bandwidth check table 73 in accordance with the flow identifier for service quality it has received through the signal line L35, carries out a bandwidth check according to these control parameters and the packet length 841 in the packet header information received through the signal line L1, and outputs the TOS information to be given to the input packet as bandwidth control information to the signal line L5.

The routing information, the filtering control signal, the policy routing information, and the bandwidth control information sent to signal lines L2 to L5 respectively enter the packet forwarding control unit 115 of the input line interface.

If the filtering control signal received through the signal line L3 indicates "to pass the packet", the packet forwarding control unit 115 writes, in the header of the first packet stored in the input buffer 114, the output line number and next hop address received as routing information through the signal line L1 as the output line number 843 and NHA 844 respectively, and writes the TOS information received as bandwidth check information through the signal line L5, as TOS 821. If the policy routing flag received through the signal line L4 indicates "to execute policy routing", it overwrites the output line number 843 and NHA 844 of the packet with the output line number and next hop address given as policy routing information. After this header rewriting, the packet forwarding control unit 115 instructs the packet read unit 116 to read the above packet through the signal line L115.

If the filtering control signal indicates "to reject the packet", the packet forwarding control unit 115 omits the instructions of rewriting packet header and making the packet read unit 116 read a packet, and discards the first packet stored in the input buffer 114. The packet forwarding control unit 115 controls the forwarding of the packets stored in the input buffer 114 one after another by positioning the input buffer read address as the first address of the next packet each time a packet from the buffer 114 is forwarded or discarded.

The router 10 performs filtering of input packets through a series of steps as mentioned above: retrieving a flow by the flow retrieval unit 30, deciding by the filtering control unit 40 as to whether to reject or accept an input packet, and discarding the packet in the input line interface 11-i if appropriate. The router 10 realizes policy routing by taking the following steps: retrieving a flow by the flow retrieval unit 30, deciding by the policy routing control unit 50 as to whether a policy routing is required, and overwriting header in the input line interface 11-i.

As shown in FIG. 1, the packet switching unit 18 has input ports PIi (i=1 to n) to be connected with input line interfaces 11i (i=1 to n) and output ports POi (i=1 to n) connected to be connected with output buffers 13i (i=1 to n). It switches packets received from each input port PIi to an output port POj as identified by the value j of output line number 843. The packets outputted from the output port POj enter the packet direction circuit 14-j where some of them are then directed to the buffer for high priority transmission 13A-j and the others to the buffer for low priority transmission 13B-j according to the information of TOS 821.

The output packets stored in the buffers 13A-j and 13B-j are read by the output line interface 12-j. The output line interface 12-j reads out the packets stored in the buffer 13A-j for high priority transmission one after another and, only when the buffer 13A-j becomes empty, the packets stored in the buffer for low priority transmission 13B-j are read out. The output line interface 12-j determines the data link layer address DMAC of the next node to receive an output packet from NHA 844 in the internal header of that output packet, and writes the data link layer address of the output line OUTj as SMAC 831 in L2 header, and writes the address determined above based on NHA 844 as DMAC 832. Then, after removal of the internal header 840, the output line interface 12-j sends out the output packet to the output line OUTj.

The router 10 controls the service quality for packets through the following steps: checking bandwidth by the service quality control unit 70, directing packets by the packet direction circuit 14-j according to the TOS information, and selectively reading packets by the output line interface 12-j.

Figure 5:
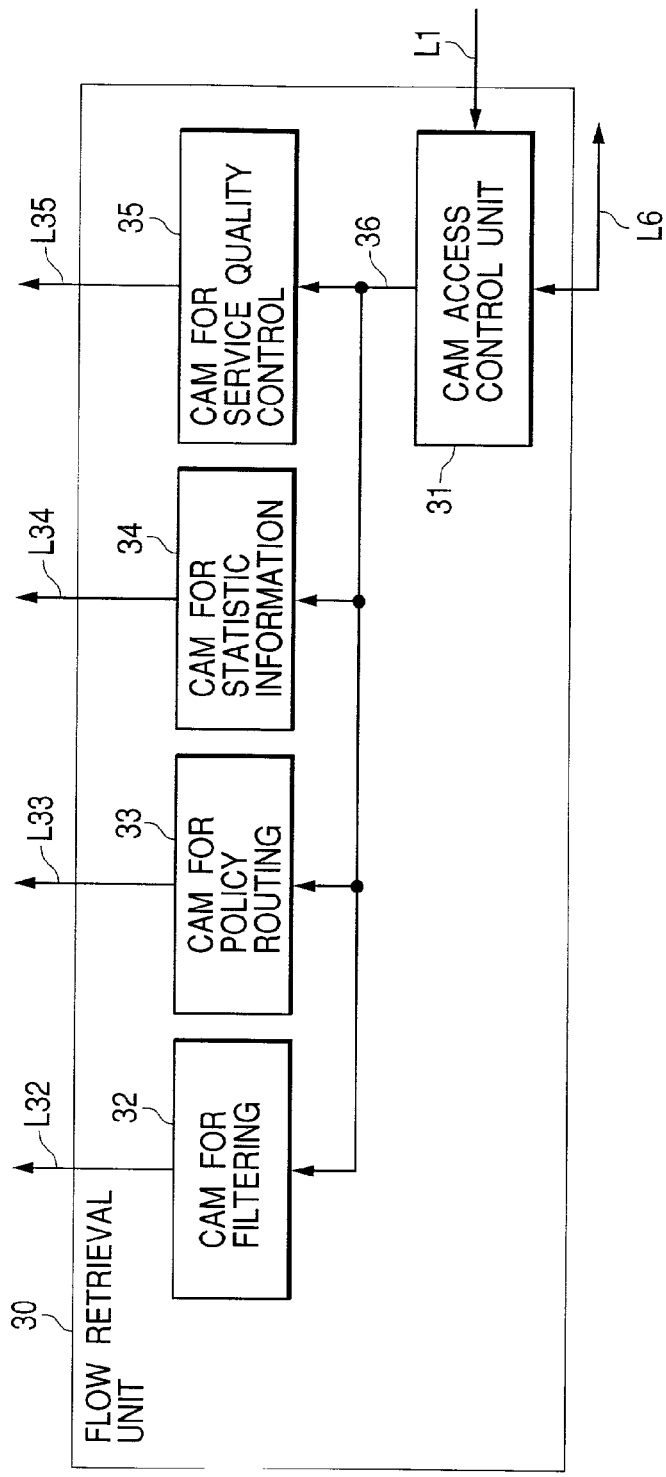
FIG. 5 is a block diagram illustrating the structure of a flow retrieval unit 30.

FIG. 5 is a block diagram showing the structure of the flow retrieval unit 30.

The flow retrieval unit 30 consists of a CAM access control unit 31, a CAM for filtering 32, a CAM for policy routing 33, a CAM for statistic information 34, and a CAM for service quality control 35. These CAMs 32 to 35 correspond to the filtering control unit 40, the policy routing control unit 50, the statistic information control unit 60, and the service quality control unit 70 as shown in FIG. 4, respectively.

Figure 6:
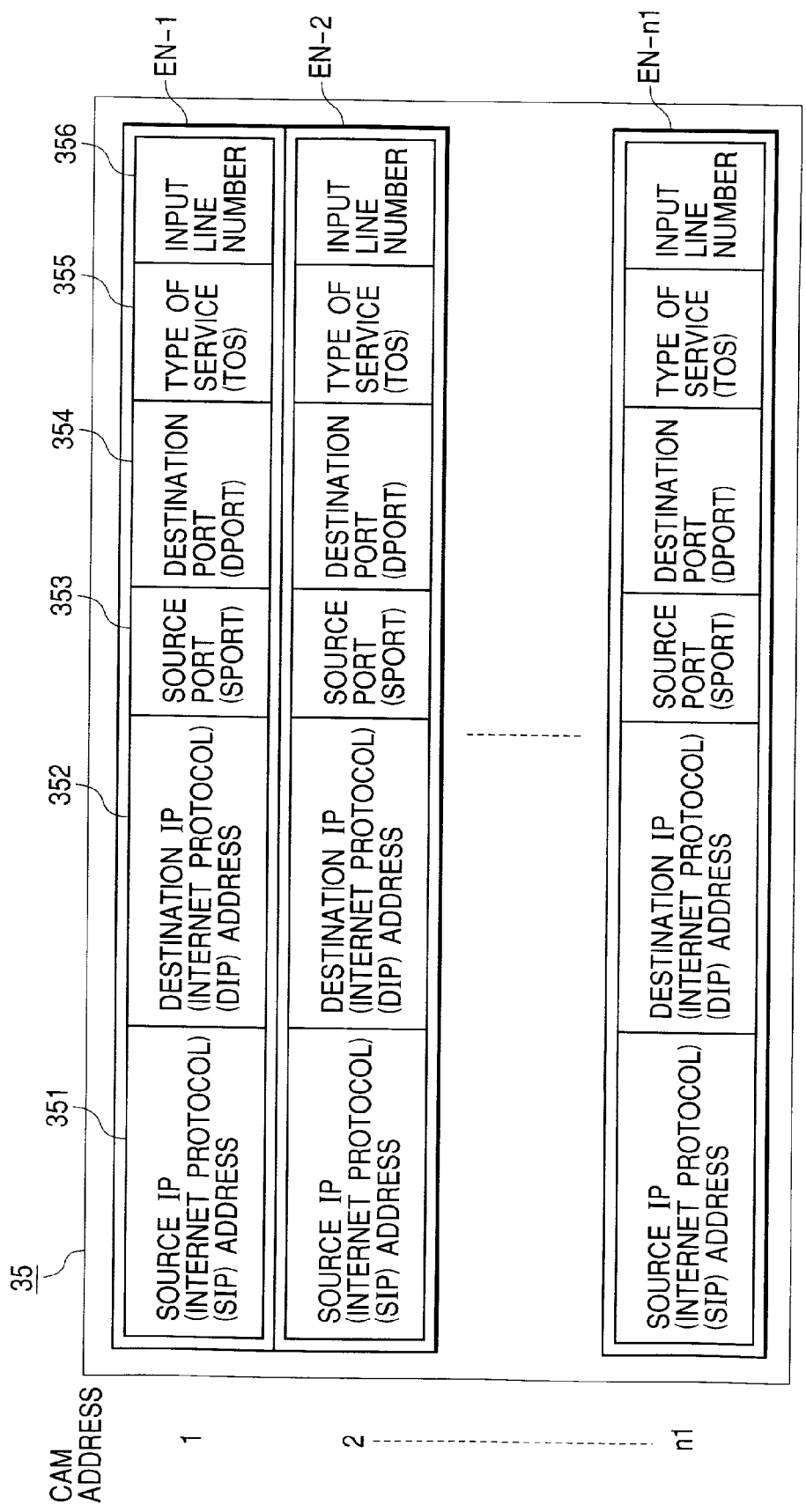
FIG. 6 shows the contents of entries for the CAM 35 for service quality control.

The CAM for service quality control 35 includes, for example, n1 flow entries EN-1 through EN-ni as shown in FIG. 6 describing the flow identification conditions for service quality control. In each flow entry, flow identification conditions are defined by a combination of SIP 351, DIP 352, SPORT 353, DPORT 354, TOS 355, and input line number 356. In this example, the other CAMs (CAM for filtering 32, CAM for policy routing 33, and CAM for statistic information 34) use the same combination of information fields as the CAM for service quality control 35, though the number of entries may be different.

The CAM access control unit 31 extracts SIP 823, DIP 824, SPORT 825, DPORT 826, TOS 821, and input line number 842 from the packet header it has received through the signal line L1, generates a flow retrieval key as a combination of these fields, and outputs it to the signal line 36. The flow retrieval key is supplied to CAMs 32 to 35 in parallel through the signal line 36. The CAMs 32 to 35 are searched to retrieve flow entries which match the above flow retrieval key in ascending order of CAM addresses, i.e., starting from the first flow entry, then output the respective retrieval results to the signal lines L32 to L35.

The search results of the CAMs include a flow identifier (flow entry CAM address) and a validity indication flag to indicate whether the flow identifier is valid or not. If there is no flow entry in one of the CAMs which matches the above-mentioned retrieval key, the validity indication flag is set to be "invalid" which represents the invalidity of the flow identifier. As the filtering control unit 40 through the service quality control unit 70 receive the search results of the CAMs through the signal lines L32 to L35, they check the validity indication flag. If the flag is "invalid", the identifier is ignored.

If the internal packet includes L2 header 830, SMAC and DMAC may be added to the flow retrieval conditions such that each CAM is accessed with the flow retrieval key containing SMAC and DMAC.

The present invention is characterized in that, as discussed above, the flow retrieval unit 30 has various CAMs to match the types of packet processing and these CAMs perform various flow judgments concurrently. According to the present invention, different types of packet forwarding control can be performed on an input packet at high speed because the various control units 40 to 70 concurrently execute different types of packet processing using the flow identifiers concurrently outputted from these CAMs.

Figure 7:
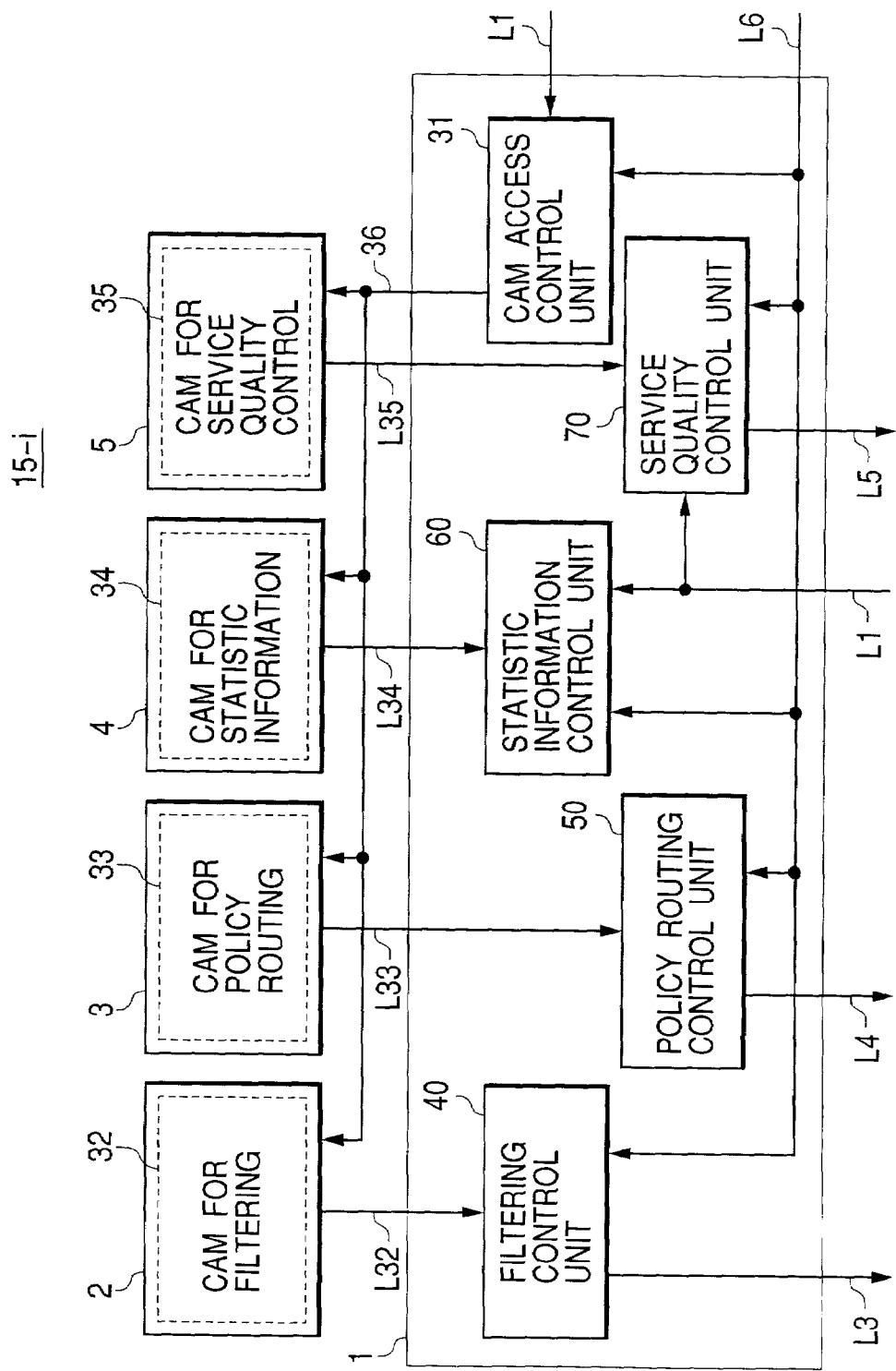
FIG. 7 shows the structure of the control unit 15 composed of semiconductor LSI chips.

FIG. 7 shows the structure of a control unit 15-i which is embodied with semiconductor LSI chips.

In this figure, numbers 2 through 5 represent semiconductor LSI chips (CAM chips): the CAM for filtering 32, CAM for policy routing 33, CAM for statistic information 34, and CAM for service quality control 35, respectively. Number 1 represents a control circuit board or a LSI chip (control chip) on which the CAM access control unit 31 as a component of the flow retrieval unit 30, and the filtering control unit 40, the policy routing control unit 50, the statistic information control unit 60, and the service quality control unit 70 in FIG. 4 are formed.

The CAM chips 2 to 5 are connected with the CAM access control unit 31 through a data line 36 which carries flow retrieval keys. In other words, the LSI pins of the control chip 1 for outputting flow retrieval keys are connected in parallel with those LSI pins for of the CAM chips 2 to 5 for inputting flow retrieval keys via the data line 36. According to the present invention, even when the number of types of packet processing increases, the number of LSI pins required for the CAM access control unit 31 does not increase such that as many CAMs as necessary for different types of packet processing can be used. In case of flow entries as shown in FIG. 6, all-bit parallel transfer for flow retrieval keys and a data width of 13 bytes or so for the data line 36 are needed. In other words, if the LSI transfers all information simultaneously (within one clock cycle), a data width of the data line 36 is 13 bytes wide. If it transfers all information within a two-clock cycle, the data width is 6.5 bytes wide.

The flow identifiers from the filtering control unit 40 to the service quality control unit 70 on the CAM chips 2 to 5 are sent in parallel to the control units in the control chip 1 through the signal lines (address lines) L32 to L35, respectively. The volume of data to be transferred by each of the address lines is $\log_2$ (the number of entries in each CAM). So, even if the number of flow entries in a CAM is 64K, the flow identifier data width per packet is 2 bytes or so. In order to receive flow identifiers from the CAM chips, the control chip 1 must have as many LSI pins as proportional to the number of types of packet processing. Since the data width of a flow identifier is smaller than that of a flow retrieval key as described above, the number of LSI pins which have to be added to receive flow retrieval keys is relatively small even when more different types of packet processing are handled.

Figure 8:
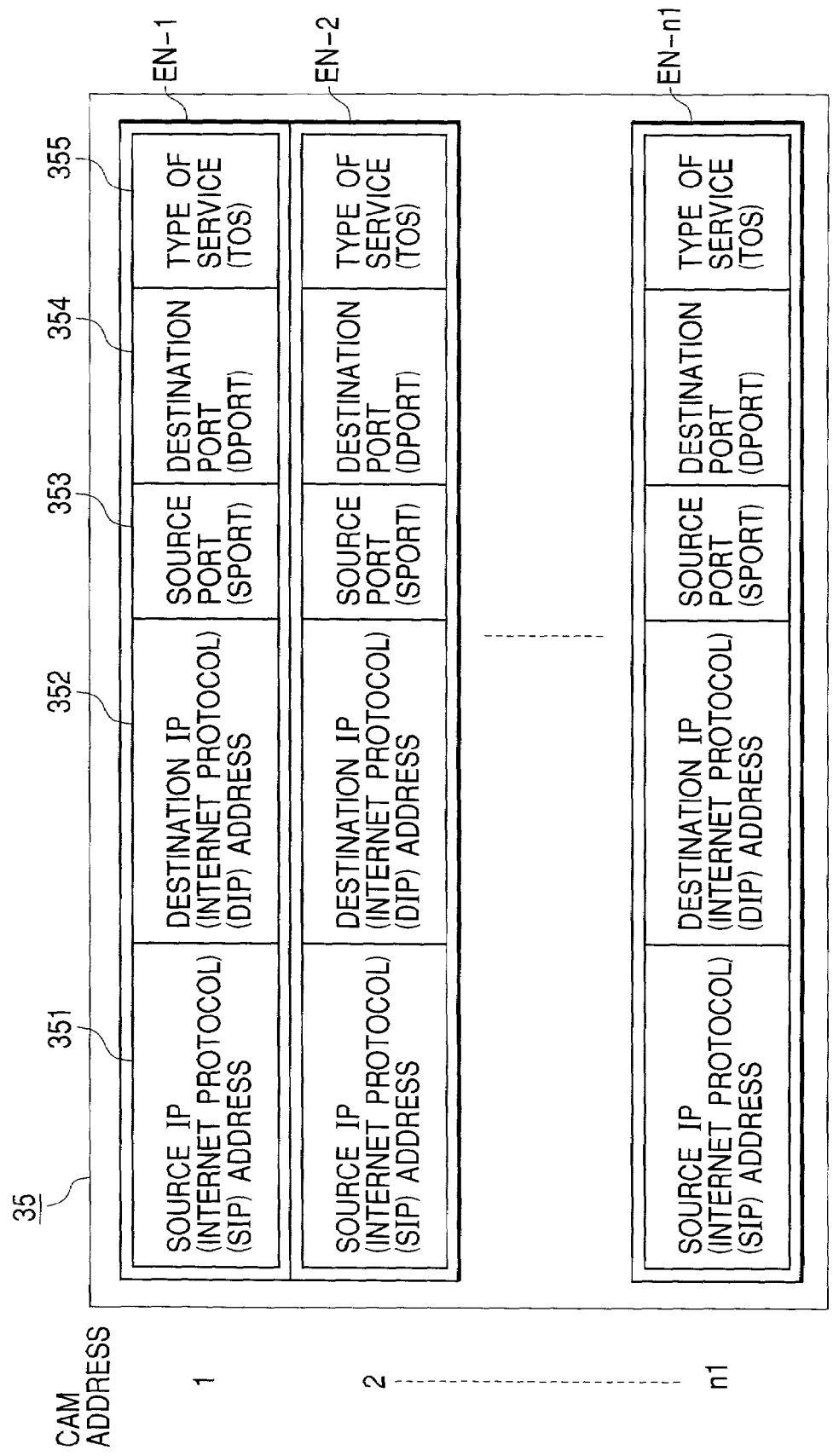
FIG. 8 shows the structure of the CAM 35 for service quality control according to another embodiment of the present invention.

If flow entries for the CAM for filtering 32, the CAM for policy routing 33, and the CAM for statistic information 34 each contains six types of header fields 351 to 356 as shown in FIG. 6, and flow entries for the CAM for service quality control 35 each contains, for example, five types of header fields 351 to 355 as shown in FIG. 8, a flow retrieval key to be given to the CAM for service quality control 35 is different from a flow retrieval key to be given to the CAMs 32 to 34.

Figure 9:
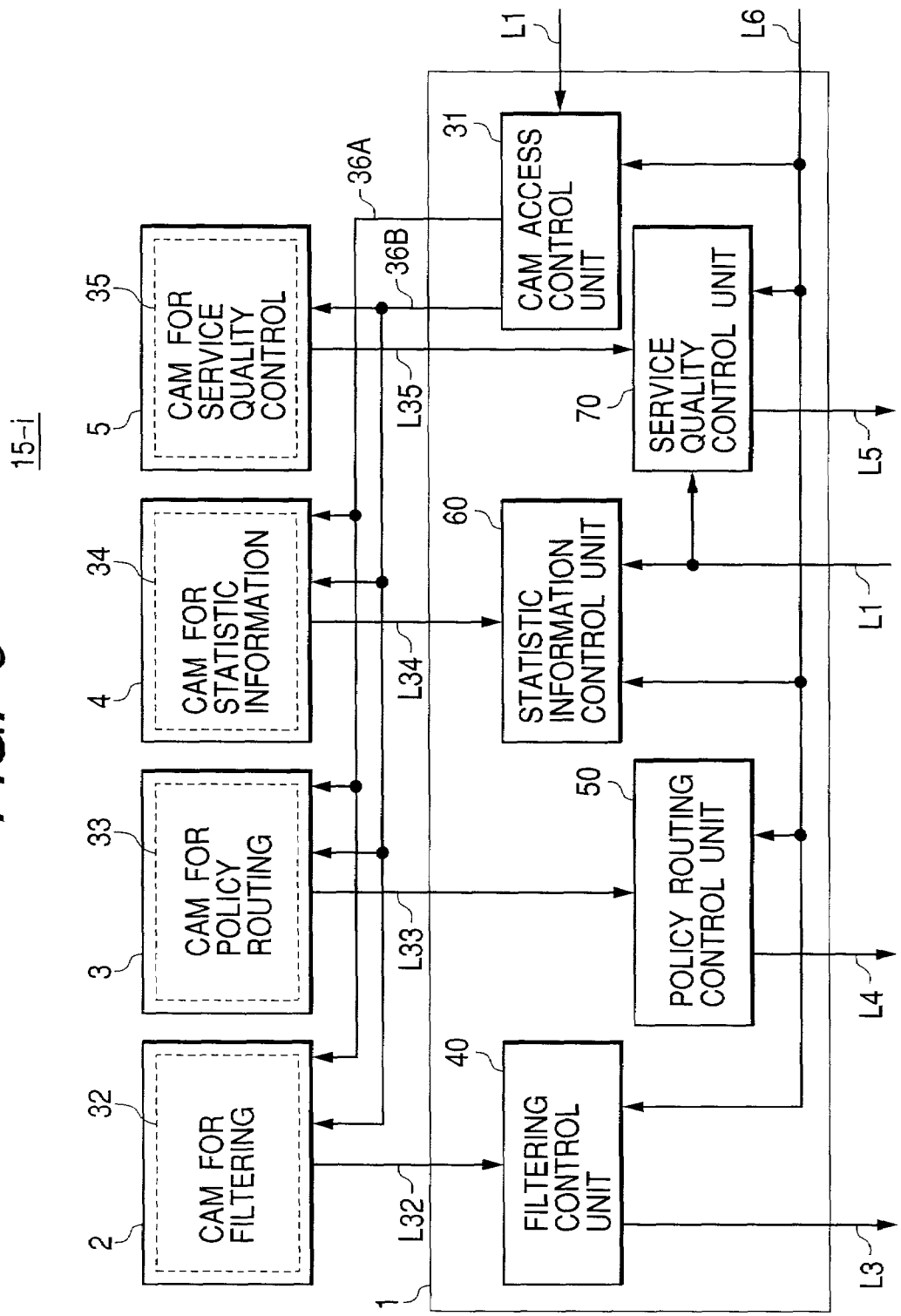
FIG. 9 shows the structure of the control unit 15 composed of semiconductor LSI chips according to another embodiment of the present invention.

FIG. 9 shows one example of a pattern of connections between the control chip 1 and the CAMs under the condition that the flow retrieval key to be given to the CAM for service quality control 35 is shorter than that to the other CAMs 32 to 34.

The CAM access control unit 31 extracts SIP 823, DIP 824, SPORT 825, DPORT 826, TOS 821, and inputs line number 842 from the packet header received through the signal line L1. It outputs the input line number 842 to the signal line 36A, and outputs the retrieval key part composed of the other header fields 823 to 826 and 821 to the signal line 36B. While the signal line 36B is connected with all the CAM chips 2 to 5, the signal line 36A is connected with the CAM chips except the CAM chip for service quality control 5, (i.e. CAM chips 2 to 4).

In this way, it is possible to arrange the key fields necessary for all CAMs to be distributed to all the CAMs over the common signal line 36B, while the key fields necessary or unnecessary only for a specific CAM to be distributed over the special signal line 36A. This arrangement effectively uses LSI pins on the control chip 1 and accesses to multiple CAMs with different retrieval keys.

Next, the structures and operations of various packet processing units (control units 40 to 70) mounted in the control unit 15 are explained.

Figure 10:
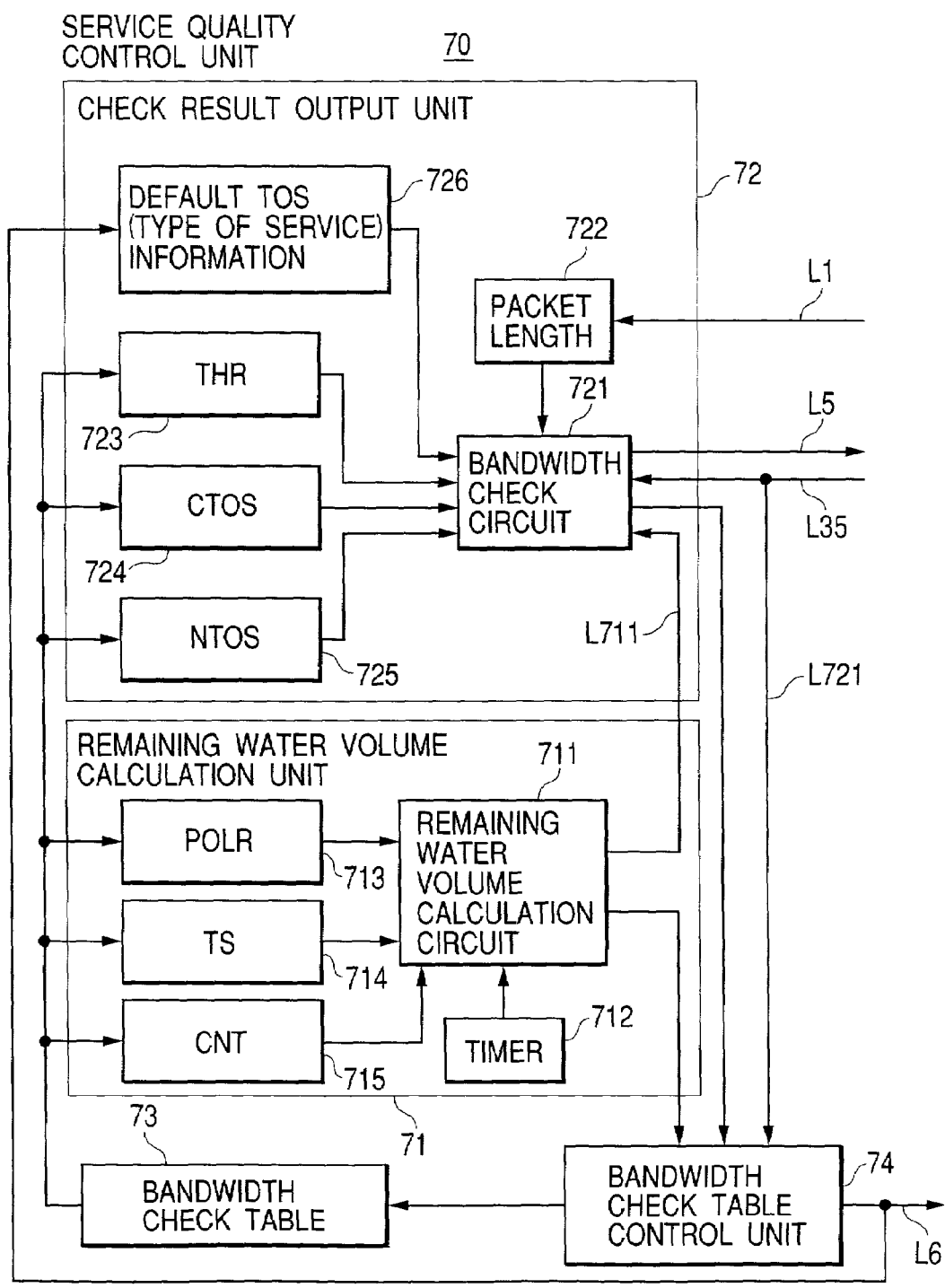
FIG. 10 is a block diagram illustrating the structure of a service quality control unit 70.

FIG. 10 is a block diagram showing the structure of a service quality control unit 70 as a preferred embodiment of the present invention.

The service quality control unit 70 checks the bandwidth of each packet flow, decides whether or not the actual packet flow conforms to the previously registered contract bandwidth and determines the TOS information to be given to each packet according to this decision. The contract bandwidth is decided in a contract between and ISP (carrier) and a customer that use the communication service. The ISP (carrier) guarantees to transfer the packets, which are transmitted from or to the customers, with a contract bandwidth.

A variable-length packet network version of the Continuous state Leaky Bucket Algorithm, which is known as a technique for measuring the packet flow bandwidth for each connection in a fixed-length packet communication network, typically an asynchronous transfer mode (ATM) network, is used as the algorithm for bandwidth check as in the following example. See 4.4.2 in "The ATM Forum Specification version 4.1."

In the Continuous-state Leaky Bucket Algorithm, the packet flow bandwidth is modeled based on the water level of a leaky bucket with a given depth which is prepared for each connection. Upon each arrival of a cell for the connection concerned, one cell of water is poured into the leaky bucket and the water collected in the bucket continues to leak at a constant rate which is proportional to the contract bandwidth for each connection, In order to allow burst transmission of cells belonging to the same connection within a range, the maximum water level for the leaky bucket is predetermined. As the cells belonging to the same connection arrive frequently, the volume of water being poured into the leaky bucket becomes larger than the leak water volume, and the water level of the bucket goes up. According to the Continuous state Leaky Bucket Algorithm, it is considered that the flow is "conformant" to the contract bandwidth unless the bucket overflows, and when the bucket overflows, an excessive cell flow (traffic) as a "non-conformance" to the bandwidth contract has occurred. In this example, the flow of water being poured into the bucket upon the arrival of a packet can be varied depending on the packet length such that the variable-length packet bandwidth is checked according to the leaky bucket algorithm.

As shown in FIG. 10, the service quality control unit 70 includes a remaining water volume calculation unit 71, a check result output unit 72, a bandwidth check table 73, and a bandwidth check table control unit 74. The remaining water volume calculation unit 71 calculates the remaining water volume of the leaky bucket which matches the flow identifier. The check result output unit 72 decides whether the packet water flow rate conforms to the contract bandwidth and outputs the decision. The bandwidth check table control unit 74 reads from the bandwidth check table 73 one bandwidth check control information entry corresponding to the flow identifier.

FIG. 11 shows the structure of the bandwidth check table 73.

The bandwidth check table 73 consists of m control information entries BE-i (i=1 to m) which correspond to flow identifiers sent through the signal line L35 from the flow retrieval unit 30 (m≦n1, n1 denotes the number of flow entries in the CAM 35). Each control information entry BE-i includes: checked traffic characteristics information which indicates the characteristics of the packet flows (traffic) to be checked, packet arrival history information which indicates the history of packet arrivals, and service quality control information.

Each bandwidth check control information entry BE-i contains, as checked traffic characteristics information, for example, the threshold THR (bytes) 731 and the contract bandwidth (policing rate) POLR (bytes/sec) 732. THR 731 corresponds to the bucket depth depending on the burst tolerance, and POLR 732 corresponds to the water leak rate of the bucket. It also includes, as packet arrival history information, TS (sec) 733 and CNT (bytes) 734. TS 733 represents the time (time stamp) of arrival of the previous packet in the same packet flow, and CNT 734 represents the bucket water level (Count) calculated by the previous bandwidth check in the same packet flow. As service quality control information, BE-i also contains CTOS (Conformant TOS) 735 and NTOS (Non-conformant TOS) 736. CTOS 735 indicates the TOS information to be allocated to the packet conforming to the contract bandwidth, while NTOS 736 indicates the TOS information to be allocated to the packet not conforming to the contract bandwidth.

In this embodiment, the remaining water volume calculation unit 71 includes a timer which shows the current time (sec) 712, a POLR storage register 713, a TS register 714, a CNT storage register 715, and a remaining water volume calculation circuit connected with these components. The check result output unit 72 includes a packet length storage register 722, a THR storage register 723, a CTOS storage register 724, an NTOS storage register 725, a default TOS (Type of Service) information storage register 726, and a bandwidth check circuit 721. The default TOS information storage register 726 indicates the TOS information to be allocated to a packet for which a flow identifier is not specified, and the bandwidth check circuit 721 decides as to conformance to the contract bandwidth from the contents of these registers.

The registers 713 to 715 are respectively set at the values of POLR 732, TS 733 and CNT 734 which are indicated by control information entries read from the bandwidth check table 73 according to the flow identifiers received through the signal line L35. The values of THR 731, CTOS 735 and NTOS 736 as indicated by the above control information entries are set on the registers 723 to 725, respectively. The management terminal 90 sets default TOS information on the register 726 through the signal line L6.

Figure 12:
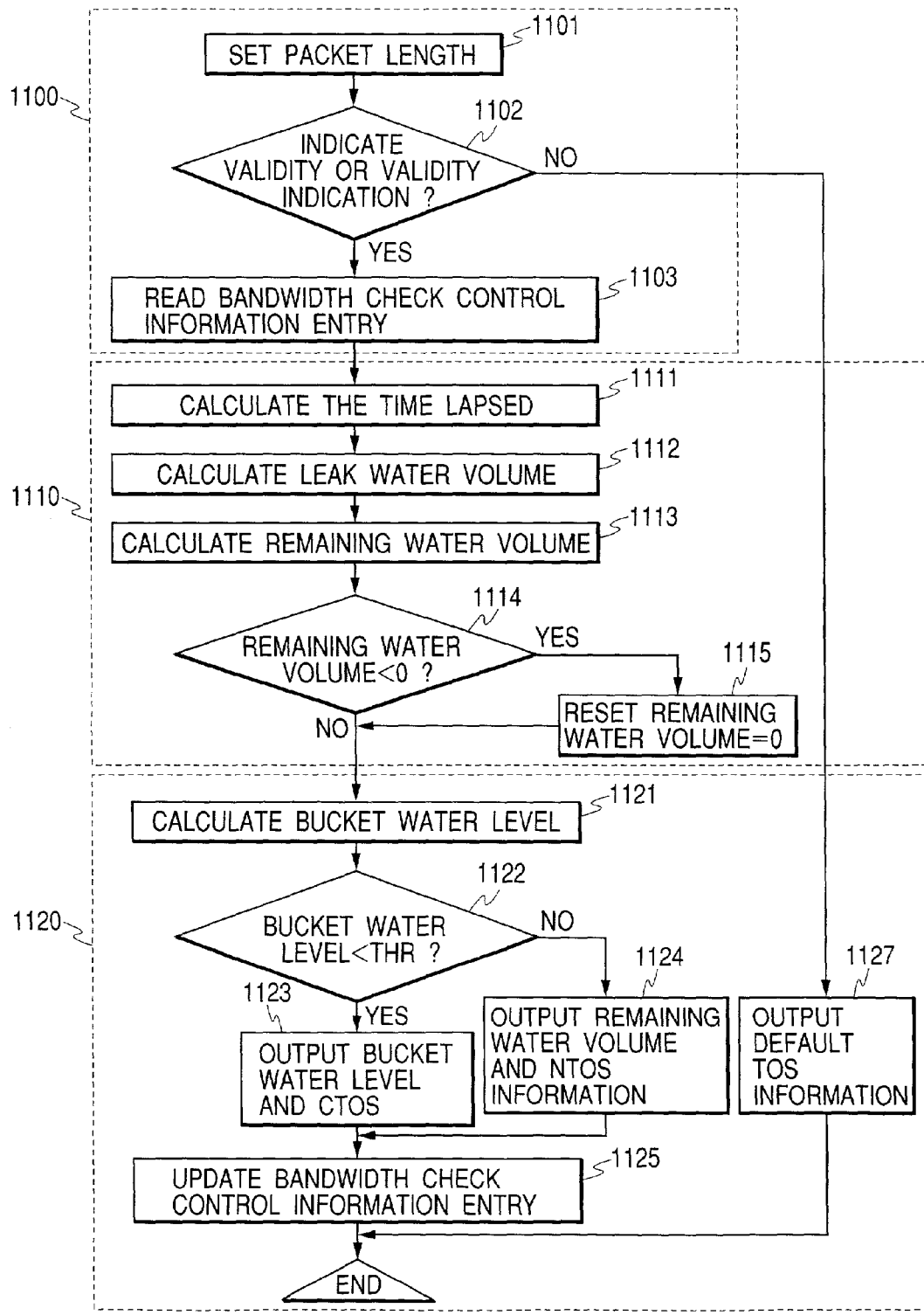
FIG. 12 is a flowchart showing the operational process of the service quality control unit 70.

FIG. 12 is a flowchart showing the operational process of the service quality control unit 70.

The service quality control unit 70 mainly performs three processes: a startup process 1100, a remaining water volume calculation process 1110, and a decision process 1120. The processes 1110 and 1120 correspond to operation of the remaining water volume calculation unit 71 and that of the check result output unit 72, respectively.

As the service quality control unit 70 receives packet header information through the signal line L1, it stores the packet length 841 extracted from the packet header information into the packet length storage register 722 of the check result output unit 72 (step 1101). Also, as it receives a validity indication flag and a flow identifier p for service quality through the signal line L35, the bandwidth check table control unit 74 and the bandwidth check circuit 721 check the validity indication flag (step 1102). If the validity indication flag indicates that the flow identifier is valid, the bandwidth check table control unit 74 reads, from the bandwidth check table 73, the control information entry BE-p (which corresponds to the above-mentioned flow identifier p) and sets the values of POLR 732, TS 733, CNT 734, THR 731, CTOS 735 and NTOS 736 as indicated by this control information entry BE-p, on the registers 713, 714, 715, 723, 724, and 725, respectively (step 1103). If the validity indication flag indicates that the flow identifier is "invalid", the bandwidth check circuit 721 outputs the default TOS information set on the register 726 to the signal line L5 (step 1127) to complete the bandwidth check process.

The remaining water volume calculation circuit 711 (as the core of the remaining water volume calculation unit 71) takes the current time from the timer 712 and calculates the elapsed time (sec) from the previous decision process in the flow to which the packet to be checked belongs by calculating the difference between the current time and the time of arrival of the previous packet TS shown by the register 714 (step 1111). Then, it calculates the bucket leak water volume in the above elapsed time by multiplying the above elapsed time by the value of the bandwidth indicated by the POLR storage register 713 (step 1112). It also calculates the bucket's remaining water volume just before the arrival of the packet of interest by subtracting the above leak water volume from the previous bucket water level CNT 734 as indicated by the CNT storage register 715 (step 1113). The remaining water volume calculation circuit 711 decides whether the above-mentioned bucket's remaining water volume is positive or negative (step 1114). If it is negative, the circuit resets the value for the bucket's remaining water volume to the initial value 0 (step 1115), then notifies the bandwidth check circuit 721 of the bucket's remaining water volume. At the same time, the remaining water volume calculation circuit 711 notifies the bandwidth check table control unit 74 of the current time used at step 1111 as a new arrival time TS.

Upon receiving the bucket's remaining water volume from the remaining water volume calculation circuit 711, the bandwidth check circuit 721 calculates the bucket water level just after the arrival of the new packet by adding the packet length (bytes) 841 (as indicated by the packet length storage register 722) to the above bucket's remaining water volume (step 1121). The circuit 721 compares the above bucket water level with the threshold THR 731 as indicated by the register 723 (step 1122). If the bucket water level exceeds the threshold THR, the circuit 721 decides that the input packet does not conform to the contract bandwidth, and outputs the value of NTOS 736 taken from the register 725 to the signal line L5, and the circuit 721 also outputs the bucket's remaining water volume information as the bucket water level before adding the packet length to the signal line L721 (step 1124). If the bucket water level does not exceed the threshold THR, the bandwidth check circuit 721 decides that the input packet conforms to the contract bandwidth, and outputs the value of CTOS 735 taken from the register 724 to the signal line L5 as well as the bucket water level information after adding the packet length to the signal line L721 (step 1123).

As the bandwidth check table control unit 74 receives the bucket water level or the remaining water volume information through the signal line L721, it writes the information as CNT 734 of control information entry BE-p in the bandwidth check table 73 and writes the arrival time TS 733 received through the signal line L711 as TS733 of the control information entry BE-p (step 1125).

Setting control information entries in the bandwidth check table 73 and altering a control parameter in each control information entry are achieved by giving the bandwidth check table control unit 74 a control message including a table address and data to be written, from the management terminal 90 through the signal line L6.

Figure 13:
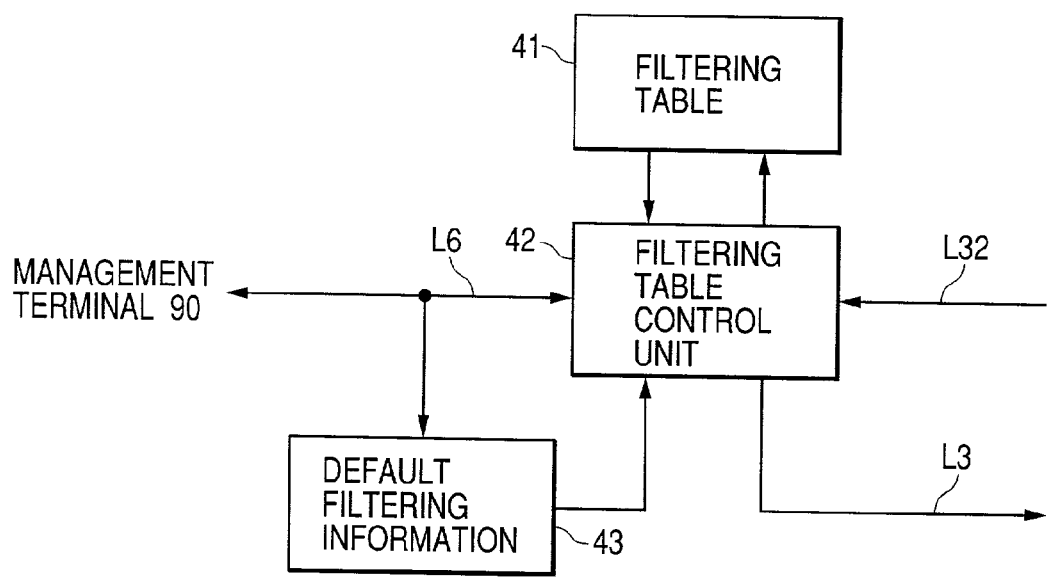
FIG. 13 is a block diagram showing the structure of a filtering control unit 40.

FIG. 13 is a block diagram showing the structure of the filtering control unit 40 as a preferred embodiment of the invention.

The filtering control unit 40 consists of a filtering table 41, a filtering control table control unit 42, and a register 43 for storing default filtering information. The management terminal 90 sets default filtering control information on the register 43 through the signal line L6.

Figure 14:
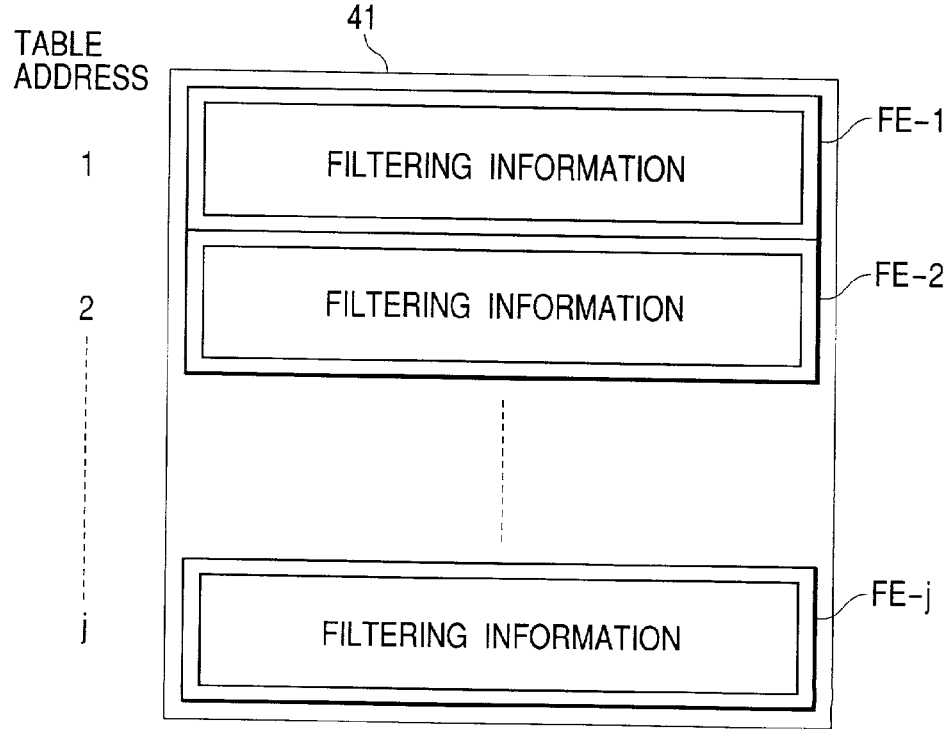
FIG. 14 shows the structure of a filtering table 41.

FIG. 14 shows the structure of the filtering table 41.

The filtering table 41 consists of j control information entries FE-i (i=1 to j) which correspond to flow identifiers sent through the signal line L35 from the flow retrieval unit 30 (j≦n2, n2 denotes the number of flow entries in the CAM 32). Each control information entry FE-i includes filtering control information which specifies whether to pass or reject the packet. Like the control information entry FE-i, the default filtering control information set on the register 43 specifies whether to pass or reject the packet.

As the filtering control unit 40 receives a validity indication flag and a flow identifier p for filtering through the signal line L32, the filtering table control unit 42 checks the validity indication flag. If the validity indication flag indicates that the flow identifier is "valid", the filtering control unit 74 reads, from the filtering table 41, the control information entry FE-p which corresponds to the above-mentioned flow identifier p and outputs it to the signal line L3. If the validity indication flag indicates that the flow identifier is "invalid", the filtering table control unit 42 outputs the default filtering information set on the register 43 to the signal line L3.

Setting control information entries in the filtering table 41 and altering filtering information are achieved by giving the filtering table control unit 42 a control message including a table address and data to be written, from the management terminal 90 through the signal line L6.

Figure 15:
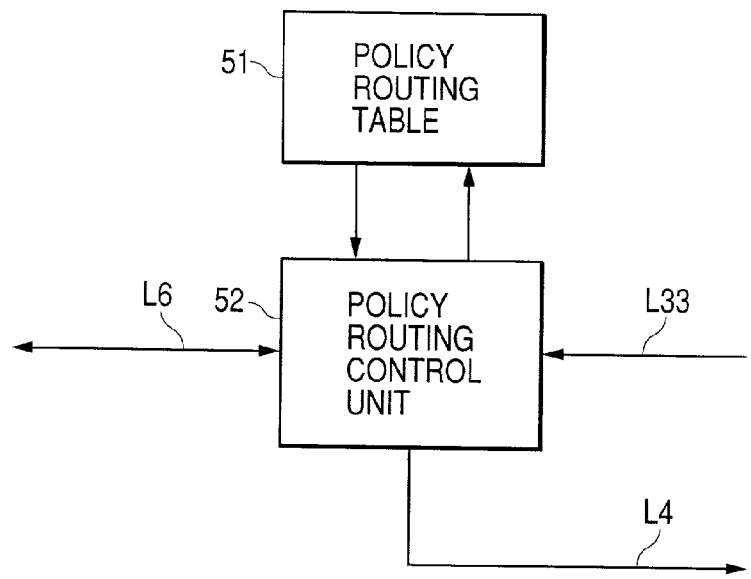
FIG. 15 is a block diagram illustrating the structure of a policy routing control unit 50.

FIG. 15 is a block diagram showing the policy routing control unit 50 as a preferred embodiment of the invention.

The policy routing control unit 50 consists of a policy routing table 51 and a policy routing table control unit 52.

Figure 16:
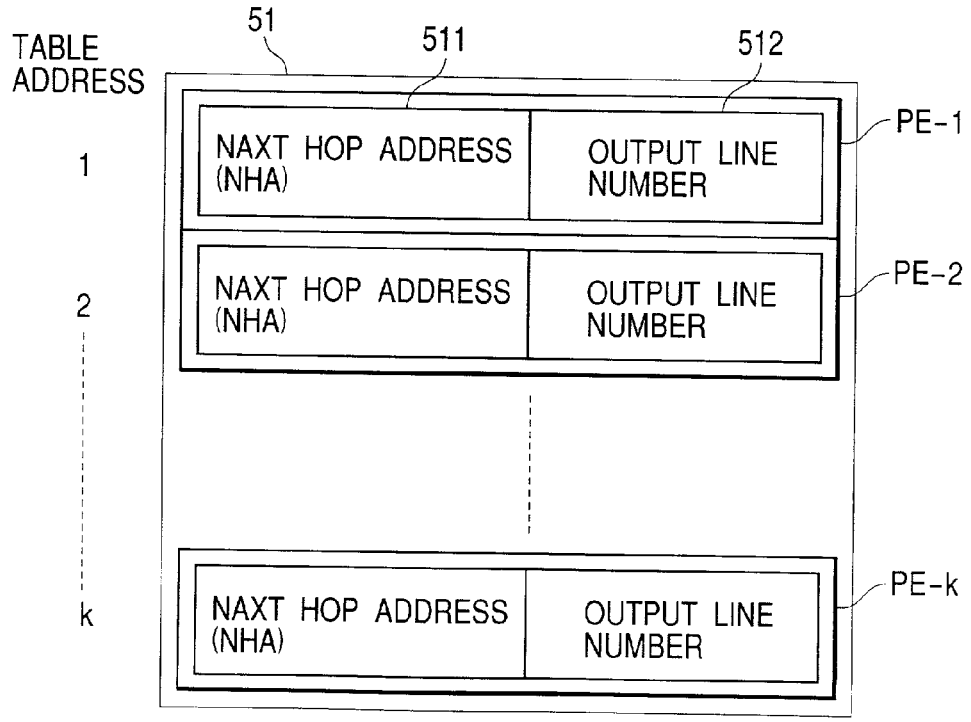
FIG. 16 shows the structure of a policy routing table 51.

FIG. 16 shows the structure of the policy routing table 51.

The policy routing table 51 consists of k control information entries PE-i (i=1 to k) which correspond to flow identifiers sent through the signal line L33 from the flow retrieval unit 30 (k≦n3, n3 denotes the number of flow entries in the CAM 33). Each control information entry PE-i includes the next hop address (NHA) 511 and the output line number 512.

As the policy routing control unit 50 receives a validity indication flag and a flow identifier p for policy routing through the signal line L33, the policy routing table control unit 52 checks the validity indication flag. If the validity indication flag indicates that the flow identifier is "valid", the policy routing control unit 52 reads, from the policy routing table 51, the control information entry PE-p which corresponds to the above-mentioned flow identifier p and outputs NHA 511, then outputs the line number 512 and the control information showing policy routing execution, as policy routing information, to the signal line L4. If the validity indication flag indicates that the flow identifier is "invalid", the policy routing table control unit 52 outputs control information showing "policy routing non-execution" to the signal line L4.

Setting control information entries in the policy routing table 51 and altering policy routing information are achieved by giving the policy routing table control unit 52 a control message including a table address and data to be written, from the management terminal 90 through the signal line L6.

Figure 17:
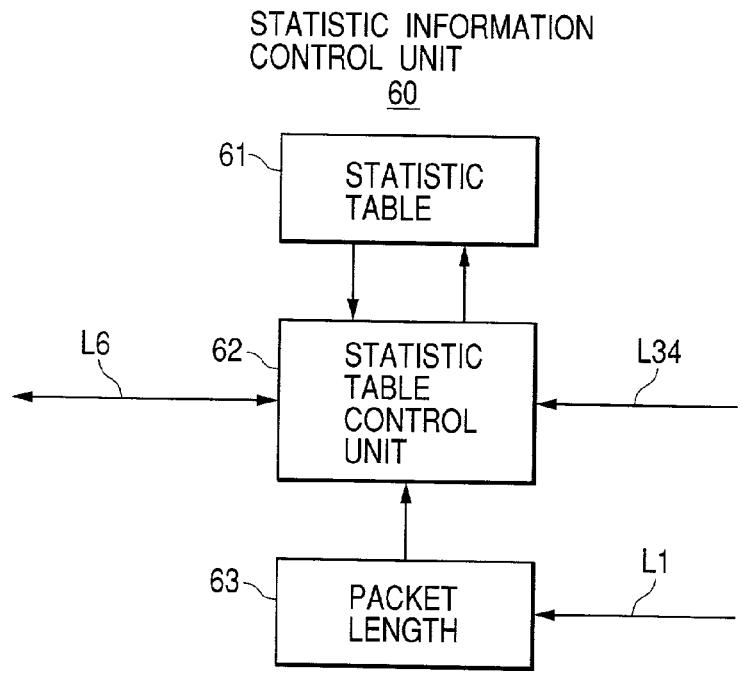
FIG. 17 is a block diagram showing the structure of a statistic information control unit 60.

FIG. 17 is a block diagram showing the structure of the statistic information control unit 60 as a preferred embodiment of the invention.

The statistic information control unit 60 consists of a statistic table 61, a statistic table control unit 62, and a register 63 which stores the packet length 841 extracted from packet header.

Figure 18:
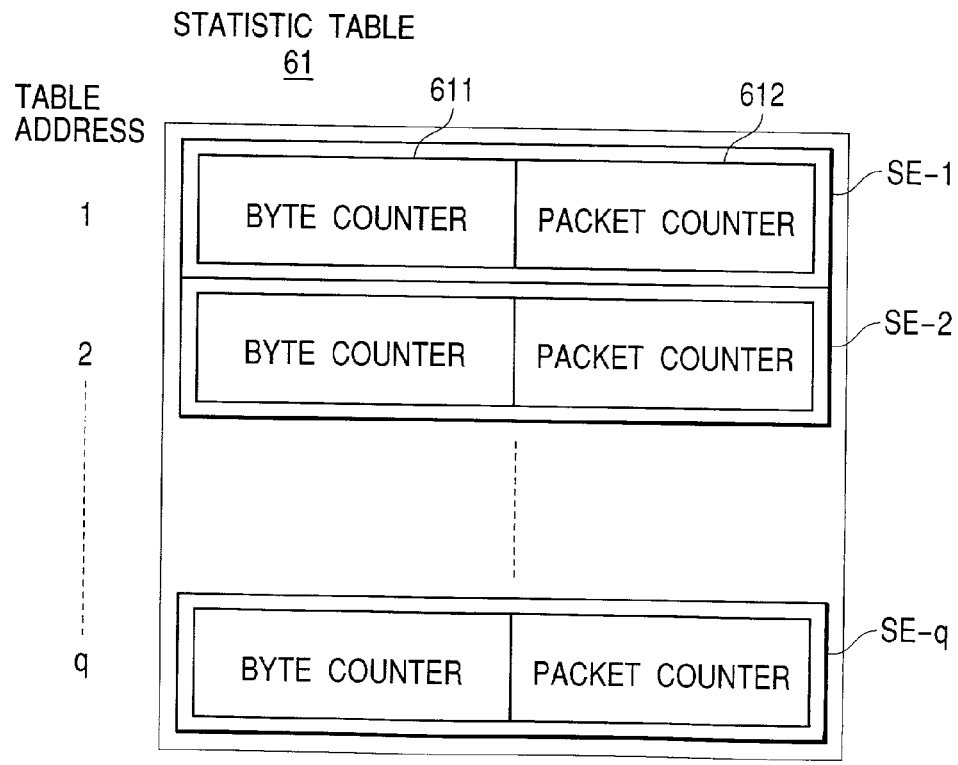
FIG. 18 shows the structure of a statistic table 61.

FIG. 18 shows the structure of the statistic table 61.

The statistic table 61 consists of q control information entries SE-i (i=1 to q) which correspond to flow identifiers sent through the signal line L34 from the flow retrieval unit 30 (q≦n4, n4 denotes the number of flow entries in the CAM 34). Each statistic entry SE-i includes a byte counter 611, which shows the sum of input packet byte lengths of each packet flow, and a packet counter 612, which shows the accumulated total of input packets of each packet flow.

As the statistic information control unit 60 receives the packet header through the signal line L1, it sets the packet length 841 extracted from the packet header onto the register 63. Also, as it receives a validity indication flag and a flow identifier p for statistic information through the signal line L34, the statistic table control unit 62 checks the validity indication flag. If the validity indication flag indicates that the flow identifier is "valid", the statistic information control unit 60 reads, from the statistic table 61, the statistic information entry SE-p which corresponds to the above-mentioned flow identifier p, then adds the packet length 841 as indicated by the register 63 to the value of the byte counter 611, adds 1 to the value of the packet counter 612, and writes the statistic information entry SE-p back into the statistic table 61.

If the validity indication flag indicates that the flow identifier is "invalid", the above-mentioned steps for reading statistic information entry SE-p and updating the counter values are omitted.

In response to the control message outputted from the management terminal 90 to the signal line L6, the statistic table control unit 62 reads the content of the statistic table 61 and sends it to the management terminal 90 through the signal line L6.

In the above embodiments, if the service quality control unit 70 detects a packet which does not conform to the contract bandwidth, the packet forwarding control unit 115 in the input line interface is designed to alter the TOS information for the non-conformant packet. However, alternatively, the non-conformant packet may be discarded by the packet forwarding control unit 115 like a packet to be decided discarded by the filtering control unit 40.

Figure 19:
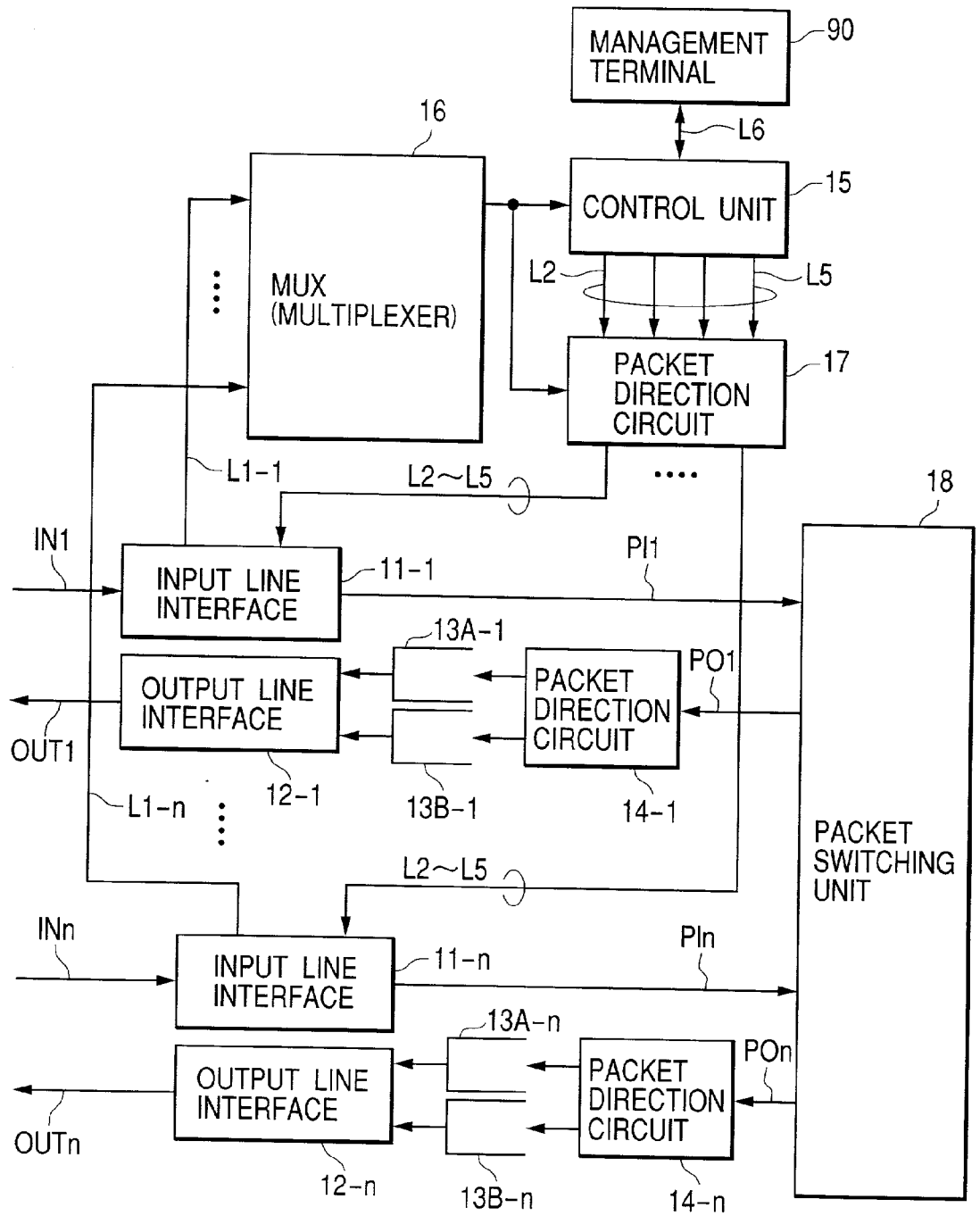
FIG. 19 is a block diagram illustrating the router 10 according to another embodiment of the present invention.

In the above embodiments, each input line interface is connected with a control unit 15 (15-1 to 15-n) which can concurrently perform various header processing functions with various CAMs. However, the present invention is not limited thereto. For example, as shown in FIG. 19, the control unit 15 may be shared by a plurality of input line interfaces 11-1 to 11-n. In this case, the packet header information outputted from each input line interface 11-i to the signal line L1-i is sent to the control unit 15 sequentially by a multiplexer (MUX) 16. The control unit 15 outputs, to signal lines L2 to L5, routing information, filtering control information, policy routing information, and bandwidth control information, which are then directed to input line interfaces 11-i as sources of the packet header information by a packet direction circuit 17. The packet direction circuit 17 identifies the input line interface 11-i as the source of particular packet header information with the input line number given by the MUX 16.

As obviously shown in the above description of the embodiments, the packet forwarding apparatus according to the present invention incorporates a plurality of CAMs for flow retrieval and a plurality of control tables to be accessed with the flow identifiers outputted from these CAMs so that various header processing functions can be performed concurrently according to the entry information as defined for each input packet by the tables.

The above-described preferred embodiments of the packet forwarding apparatus of the present invention implements a packet forwarding method for performing at least two packet controlling function concurrently. Such a method starts with defining a plurality sets of flow identification conditions to classify input packages into flows each with one set of flow identification conditions. The flow identification conditions are then stored in at least two content addressable memories (CAMs). The header information of each input packet is compared and matched with a plurality sets of flow identification conditions to identify at least two flows. One flow identifier associated with the input packet is designated for each of the identified flows. The flow identifiers are outputted concurrently and respectively to at least two header processing units. In each of the header processing units, an information table including a plurality of information entries is incorporated, a single information entry from is read from the information table according to the respective flow identifier, and a given arithmetic operation is executed with the single information entry. The input packet is then forwarded according to the control information which includes the executed result from at least one of the header processing units.

The foregoing invention has been described in terms of preferred embodiments. However, those skilled in the art will recognize that many variations of such embodiments exist. Such variations are intended to be within the scope of the present invention and the appended claims.

What is claimed is:

1. A packet forwarding apparatus, connected with a plurality of input lines and output lines, which forwards each input packet received from each of the input lines to an output line as identified by header information of the input packet, the apparatus comprising:
a flow retrieval unit for comparing and matching the header information of the input packet with a plurality sets of flow identification conditions each set of which is used for classifying input packets into a flow and stored in one content addressable memory (CAM) of the flow retrieval unit, and for outputting at least two flow identifiers appropriate to the input packet concurrently to at least two header processing units respectively corresponding to each of the flow identifiers;
said header processing units each of which incorporates an information table including a plurality of information entries, reads a single information entry from the information table according to the respective flow identifier outputted from the flow retrieval unit, and executes a given arithmetic operation using the single information entry; and
means for forwarding the input packet according to control information which includes the executed result from at least one of the header processing units.

2. The packet forwarding apparatus as claimed in claim 1, further comprising a plurality of input line interfaces connected with said input lines, each of the input line interfaces including:

a means for extracting from each input packet the header information and supplying the extracted header information to the flow retrieval unit; and
a packet rewriting means for rewriting a portion of the header information according to the control information from at least one of the header processing units.

3. The packet forwarding apparatus as claimed in claim 2, wherein the flow retrieval unit comprises a memory access control unit for generating a flow retrieval key from the header information received from the input line interfaces, and for concurrently accessing the CAMs with the flow retrieval key, wherein
each of the CAMs consists of a plurality of flow entries indicating the respective flow identification conditions, and
each of the header processing units reads an information entry from the information table according to the respective flow identifiers outputted concurrently from the CAMs.

4. The packet forwarding apparatus as claimed in claim 3, wherein the CAMs are accessed concurrently with the same flow retrieval key outputted from the memory access control unit.

5. The packet forwarding apparatus as claimed in claim 3, wherein at least one of the CAMs has a plurality of flow entries to be accessed with a flow retrieval key other than the one used for the other CAMs; and
wherein the memory access control unit outputs the flow retrieval key in two forms, one form having common key fields for at least one common content addressable memory and the other form having specific key fields for at least one specific content addressable memory, the common and specific key fields are selectively inputted as a flow retrieval key to at least one of the CAMs.

6. The packet forwarding apparatus as claimed in claim 2, wherein each of the input line interfaces has a means for providing the input packet with an respective internal header including at least an input line number, wherein the means for supplying the extracted header information to the flow retrieval unit supplies the header information including said internal header.

7. The packet forwarding apparatus as claimed in claim 1, wherein the header processing units concurrently execute arithmetic operations for performing at least two of collecting statistic information, service quality control, packet policy routing control, and packet filtering control, for each flow.

8. The packet switching apparatus as claimed in claim 1, wherein the flow identification conditions are defined based upon at least two of the group included in the packet header: a source address, a destination address, an application identifier at the source, an application identifier at the destination, and priority information of packet forwarding.

9. A packet forwarding apparatus, connected with a plurality of input lines and output lines, which forwards each input packet received from each of the input lines to an output line as identified by header information of the input packet, the apparatus comprising:
a plurality of input line interfaces connected with the input lines;
a plurality of output line interfaces connected with the output lines;
a packet switch connected between the input line interfaces and the output line interfaces; and a plurality of control units provided for each of the input line interfaces, each of the control units includes:

a means for receiving packet header information from one of the input line interfaces;

a flow retrieval unit which generates a flow retrieval key from the packet header information, compares the packet header information with a plurality sets of predetermined flow identification conditions each set of which is used for classifying input packets into a flow and stored in one content addressable memory (CAM) of the flow retrieval unit, and outputs concurrently various flow identifiers which correspond to the retrieval key; and a plurality of header processing units each of which has an information table containing a plurality of information entries and receives one of the flow identifiers outputted from the flow retrieval unit, and each of the header processing units reads a single information entry from said information table according to a specific type of flow identifier outputted from the flow retrieval unit and executes an arithmetic operation with the information entry, wherein each of the input line interfaces has a means for rewriting a portion of the input packet header information according to control information which includes the executed result outputted from at least one of the header processing units.

10. The packet forwarding apparatus as claimed in claim 9, wherein the flow retrieval unit further includes a memory access control unit for generating the flow retrieval key from the header information outputted from the input line interfaces and for concurrently accessing the CAMs with the flow retrieval key.

11. A packet forwarding apparatus, connected with a plurality of input lines and output lines, which forwards each input packet received from each of the input lines to an output line as identified by header information of the input packet, the apparatus comprising:

a plurality of input line interfaces connected with the input lines;

a plurality of output line interfaces connected with the output lines;

a packet switch connected between the input line interfaces and the output line interfaces; and a plurality of control units provided for each of the input line interfaces, each of the control units includes:

a means for receiving packet header information from one of the input line interfaces;

a flow retrieval unit which generates a flow retrieval key from the packet header information, compares the packet header information with a plurality sets of predetermined flow identification conditions each set of which is used for classifying input packets into a flow and stored in one content addressable memory (CAM) of the flow retrieval unit, and outputs concurrently various flow identifiers which correspond to the retrieval key; and a plurality of header processing units each of which has an information table containing a plurality of information entries and receives one of the flow identifiers outputted from the flow retrieval unit, and each of the header processing units reads a single information entry from said information table according to a specific type of flow identifier outputted from the flow retrieval unit and executes an arithmetic operation with the information entry; and a means for supplying control information which includes the executed result from at least one of the header processing units, to the input line interface as a source of the packet header, wherein each of the input line interfaces has a means for rewriting a portion of the input packet header information according to the control information received from the control unit.

12. The packet forwarding apparatus as claimed in claim 11, wherein the flow retrieval unit further includes a memory access control unit for generating the flow retrieval key from the header information outputted from the input line interfaces and for concurrently accessing the CAMs with the flow retrieval key.

13. The packet forwarding apparatus as claimed in claim 10, wherein the CAMs are accessed concurrently with the same flow retrieval key outputted from the memory access control unit.

14. The packet forwarding apparatus as claimed in claim 12, wherein the plural content addressable memories are concurrently accessed using the same flow retrieval key outputted from the memory access control unit.

15. The packet forwarding apparatus as claimed in claim 10, wherein at least one of the CAMs has a plurality of flow entries to be accessed with a flow retrieval key other than the one used for the other CAMs; and wherein the memory access control unit outputs the flow retrieval key in two forms, one form having common key fields for at least one common content addressable memory and the other form having specific key fields for at least one specific content addressable memory, the common and specific key fields are selectively inputted as a flow retrieval key to at least one of the CAMs.

16. The packet forwarding apparatus as claimed in claim 12, wherein at least one of the CAMs has a plurality of flow entries to be accessed with a flow retrieval file key other than the one used for the other CAMs; and wherein the memory access control unit outputs the flow retrieval key in two forms, one form having common key fields for at least one common content addressable memory and the other form having specific key fields for at least one specific content addressable memory, the common and specific key fields are selectively inputted as a flow retrieval key to at least one of the CAMs.

17. The packet forwarding apertures as claimed in claim 1, wherein the flow retrieval unit comprise a CAM control chip for outputting the header information to the CAMs via at least one predetermined output pin.

18. The packet forwarding apparatus as claimed in claim 17, wherein the number of the CAMs is larger the number of the output pin.

* * * * *